United States Patent
Haka

(10) Patent No.: US 7,163,483 B2
(45) Date of Patent: Jan. 16, 2007

(54) THREE SPEED TRANSFER CASE WITH TWO TRANSFER CHAINS

(75) Inventor: Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/807,769

(22) Filed: Mar. 24, 2004

(65) Prior Publication Data

US 2005/0215377 A1    Sep. 29, 2005

(51) Int. Cl.
F16H 37/02 (2006.01)
F16H 17/34 (2006.01)
B60K 17/342 (2006.01)

(52) U.S. Cl. ............... 475/212; 475/210; 475/211; 475/213; 475/218; 180/241; 180/251

(58) Field of Classification Search ........ 475/210–212, 475/218, 198; 180/241, 251
See application file for complete search history.

(56) References Cited

U.S. PATENT DOCUMENTS

| 3,869,940 | A | * | 3/1975 | Webb et al. ............... 475/85 |
| 4,349,091 | A | | 9/1982 | Miyake et al. ............ 192/53 F |
| 4,553,450 | A | * | 11/1985 | Gizard ........................ 475/212 |
| 5,342,258 | A | * | 8/1994 | Egyed ......................... 475/281 |
| 5,803,858 | A | * | 9/1998 | Haka ........................... 475/210 |
| 5,833,566 | A | * | 11/1998 | Showalter .................... 475/198 |
| 5,853,342 | A | * | 12/1998 | Pritchard et al. ........... 475/206 |
| 5,954,612 | A | * | 9/1999 | Baxter, Jr. ................... 475/198 |
| 6,045,476 | A | * | 4/2000 | Haka ........................... 475/198 |
| 6,106,428 | A | * | 8/2000 | Koneda et al. ............. 475/210 |
| 6,464,612 | B1 | * | 10/2002 | Frost ........................... 475/288 |
| 6,612,959 | B1 | * | 9/2003 | Frost ........................... 475/288 |
| 6,926,634 | B1 | * | 8/2005 | Haka ........................... 475/198 |
| 2004/0180749 | A1 | * | 9/2004 | Haka ........................... 475/210 |

* cited by examiner

Primary Examiner—Tisha Lewis
(74) Attorney, Agent, or Firm—Christopher DeVries

(57) ABSTRACT

A transfer case for a vehicle having front and rear axles includes three input clutches connected to first, second and third members of a planetary gear set. First and second transfer chains are connected to each other and operatively engageable between the planetary gear set and the front and rear axles. At least one of the transfer chains is connected with a member of the planetary gear set. A four wheel drive clutch is operative to selectively connect the front and rear axles. The four wheel drive clutch and three input clutches are selectively engageable to provide three speed ratios and four wheel drive.

21 Claims, 4 Drawing Sheets

THREE SPEED TRANSFER CASE WITH TWO TRANSFER CHAINS

TECHNICAL FIELD

The present invention relates to a three speed transfer case having a planetary gear set, four clutches and two transfer chains to provide three distinct final drive ratios, as well as four wheel drive and/or all wheel drive.

BACKGROUND OF THE INVENTION

Four wheel drive (4WD) vehicles provide traction which is often unattainable in two wheel drive (2WD) vehicles by delivering power to both of the vehicle's axles. Attendant with the added traction provided by four wheel drive is the added complexity of the drive train required to control and deliver power to all four wheels as opposed to only two wheels. Four wheel drive characteristically does not have a center differential which would maintain a fixed fraction of torque delivered to each axle, but rather maintains the same speed at each axle regardless of the torque split between the two axles. The delivery of power between the front wheels and the rear wheels of the vehicle is typically handled by a transfer case mechanism which usually includes either a mechanically or electronically controlled clutch to switch between rear wheel drive and four wheel drive.

In all wheel drive (AWD) systems, the front and rear axles are continually in driving engagement with the transfer case, but the system contains a center differential to maintain a fixed ratio of torque between the front and rear axle.

In addition to controlling the transfer of torque between front and rear axles of a vehicle, the transfer case may also include a planetary gear set or set of countershaft gears which provides an underdrive or overdrive ratio. Further, rather than manufacturing a new five or six speed transmission, an existing four speed transmission may be used with a multi speed transfer case to provide additional speed ratios, such as for stump pulling (extreme underdrive), or in a top gear—overdrive condition.

All wheel drive transfer cases typically contain a planetary gear set to provide the center differential function that maintains a constant torque split between the front and rear axle independent of tire speed or slip. The vehicle is also typically equipped with identical front and rear axle ratios and identical front and rear tire rolling radii in order to minimize the power (torque related losses) circulated in the center differential. The typical all wheel drive transfer case only provides a direct or 1:1 torque ratio to the axles, and does not contain any ratio changing clutches because there is only one mode of operation. Some all wheel drive transfer cases provide a friction clutch across the center differential to dynamically change the front to rear torque ratio.

SUMMARY OF THE INVENTION

The present invention provides a transfer case with improved functionality by enabling three distinct final drive ratios, as well as the ability to shift into or out of four wheel drive "on the fly" (i.e., with the wheels spinning but no torque present) in any ratio. This improvement is achieved by providing a transfer case including a planetary gear set with three input clutches, as well as two transfer chains and a four wheel drive clutch.

More specifically, the invention provides a transfer case for a vehicle having front and rear axles. The transfer case includes first, second and third input clutches connected to first, second and third members of a planetary gear set, respectively. First and second transfer chains are connected to each other and operatively engageable between the planetary gear set and the front and rear axles. At least one of the transfer chains is connected with one of the members of the planetary gear set. A four wheel drive clutch is operative to selectively connect the front and rear axles. The four wheel drive clutch and the first, second and third input clutches are selectively engageable to provide three speed ratios and four wheel drive.

In one embodiment, the first, second and third members comprise a sun gear, carrier and ring gear, respectively. The ring gear is connected to the first chain, and the sun gear is connected to the second chain. The first chain has a 1:1 chain ratio, and the second chain has an underdrive ratio. The four wheel drive clutch selectively connects the second chain to the front axle.

In an alternative embodiment, the first, second and third members comprise a ring gear, carrier and sun gear, respectively. The ring gear is connected to the first chain, and the sun gear is connected to the second chain. The first chain has an underdrive ratio, and the second chain has a 1:1 ratio. The four wheel drive clutch selectively connects the first and second chains with the front axle. The sun gear is directly connected with the rear axle.

In the embodiments described above, the first, second and third clutches and the four wheel drive clutch are selectively engageable to provide rear wheel drive low, four wheel drive low, rear wheel drive mid, four wheel drive mid, rear wheel drive high and four wheel drive high ratios.

In a second alternative embodiment of the invention, the first, second and third members of the planetary gear set comprise a sun gear, carrier and ring gear, respectively. The ring gear is connected with the first chain, and the second chain is connectable with the sun gear and the rear axle through the four wheel drive clutch. The first, second and third clutches and the four wheel drive clutch are selectively engageable to provide rear wheel drive low, four wheel drive low, all wheel drive mid, four wheel drive mid, front wheel drive high, and four wheel drive high ratios.

In a third alternative embodiment of the invention, the first, second and third members of the planetary gear set comprise a ring gear, carrier and sun gear, respectively. The ring gear is connected to the first chain, and the sun gear is connected with the rear axle. The first chain has an underdrive ratio and the second chain has a 1:1 ratio. The four wheel drive clutch selectively connects the ring gear and the first chain with the rear axle.

The invention also provides a drive train for a vehicle including front and rear axles having different axle ratios, as well as a transfer case as described above in the first embodiment and the second alternative embodiment.

The above features and advantages, and other features and advantages of the present invention are readily apparent from the following detained description of the best modes for carrying out the invention when taken in connection with the accompanying drawings.

BRIEF DESCRIPTION OF THE DRAWINGS

FIG. 1b shows a schematic stick diagram corresponding with the lever diagram of FIG. 1a;

FIG. 2b shows a schematic stick diagram corresponding with the lever diagram of FIG. 2a;

FIG. 3b shows a schematic stick diagram corresponding with the lever diagram of FIG. 3a;

FIG. 4b shows a schematic stick diagram corresponding with the lever diagram of FIG. 4a.

DESCRIPTION OF THE PREFERRED EMBODIMENTS

Figure 1A:
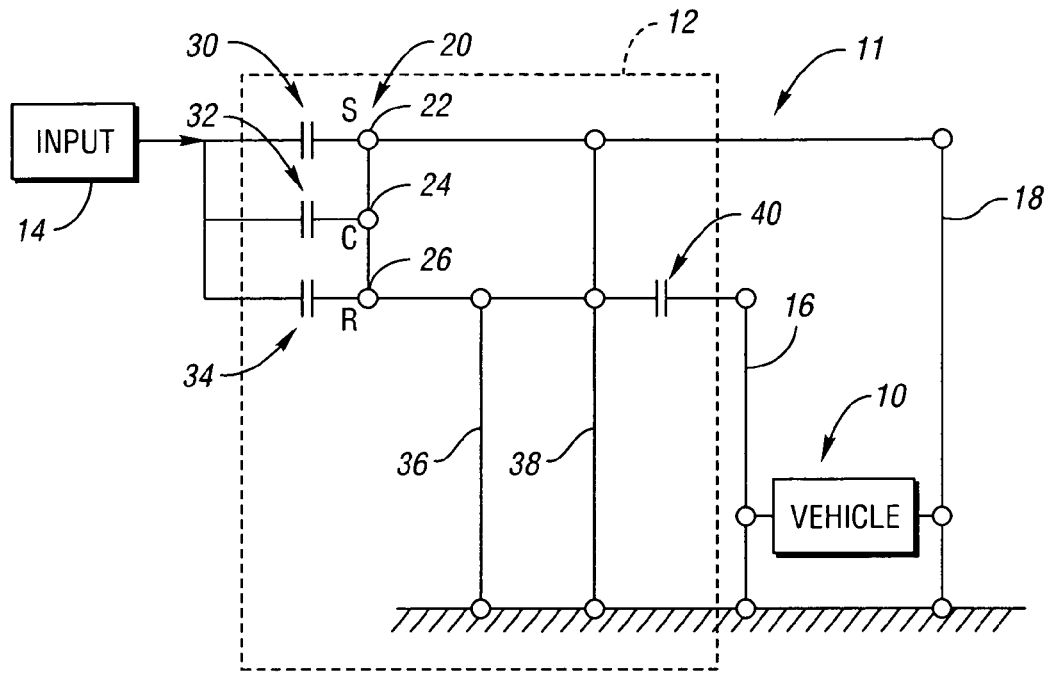
FIG. 1a shows a schematic lever diagram illustrating a drive train in accordance with the invention.
Figure 1B:
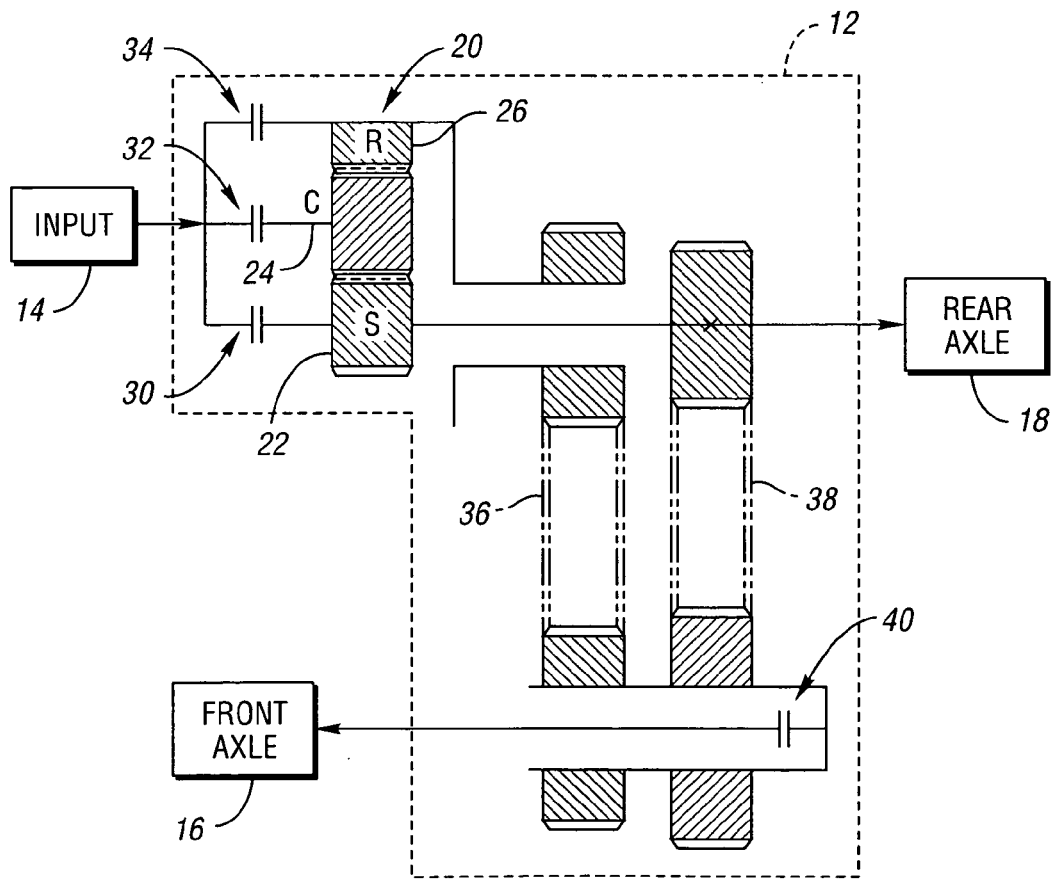

Referring to FIGS. 1a and 1b, a lever diagram and stick diagram are shown, respectively, illustrating a vehicle 10 having a drive train 11 which includes a transfer case 12 for receiving torque from an input 14 and distributing the torque between the front and rear axles 16, 18 of the vehicle 10. Preferably, the front and rear axles have different axle ratios. The "axle ratio" is the relationship between the vehicle's drive shaft (or propeller shaft) and its wheel axle. For instance, a 4:1 or 4.0 axle ratio means that the drive shafts turns four times for every one time the axle turns. The higher the axle ratio, the greater the force that can be applied to the drive wheels for tasks like towing up a grade or pulling a boat out of the water. With the present invention, for example, the front axle may have a ratio of 3.15 and the rear axle may have a ratio of 4.10. However, the invention described herein would also be applicable to a vehicle having identical front and rear axle ratios.

The transfer case 12 includes the planetary gear set 20 which is a simple planetary gear set including first, second and third members. The first member is the sun gear 22, the second member is the carrier 24, and the third member is the ring gear 26.

First, second and third input clutches 30, 32, 34 are connected to the sun gear 22, carrier 24, and ring gear 26, respectively. Accordingly, the first input clutch 30 selectively connects the sun gear 22 with the input 14, the second input clutch selectively connects the carrier 24 with the input 14, and the third input clutch 34 selectively connects the ring gear 26 with the input 14.

The transfer case 12 also includes first and second transfer chains 36, 38 which are connected to each other and operatively engageable between the planetary gear set 20 and the front and rear axles 16, 18. As shown, the first transfer chain 36 is directly connected with the ring gear 26, and the second transfer chain 38 is directly connected with the sun gear 22. The first transfer chain 36 has a 1:1 chain ratio, and the second transfer chain 38 has a ratio which is equal to the rear axle ratio divided by the front axle ratio (1.30:1 underdrive).

The transfer case 12 also includes a four wheel drive clutch 40 which is operative to selectively connect the front and rear axles 16, 18.

The clutches 30, 32, 34 and 40 may be dog clutches. Sample dog clutches for use with the present invention are shown, for example, in U.S. Pat. No. 4,349,091, which is hereby incorporated by reference in its entirety.

To achieve a rear wheel drive low ratio, the first input clutch 30 is engaged so that power flows from the input 14 through the first input clutch 30 and sun gear 22 to the rear axle 18. With the first input clutch 30 engaged, four wheel drive low may be activated by engaging the four wheel drive clutch 40. In this configuration, the second transfer chain 38 is active.

To achieve the rear wheel drive "mid" ratio, the second input clutch 32 is engaged and power flows through the carrier 24 and is split between the sun gear 22 and ring gear 26. From the sun gear 22, power flows to the rear axle 18. From the ring gear 26, power flows through the chains 36, 38 to the rear axle 18. Four wheel drive mid may be achieved by then engaging the four wheel drive clutch 40. Both transfer chains 36, 38 are active in four wheel drive mid mode.

To achieve rear wheel drive high, the third input clutch 34 is engaged so that power flows through the ring gear 26, through both transfer chains 36, 38 to the rear axle 18. Four wheel drive high may then be achieved by engaging the four wheel drive clutch 40 to connect the transfer chains 36, 38 to the front axle 16.

Maximum fuel economy will occur in the rear wheel drive high ratio with the third input clutch 34 engaged. In this configuration, both transfer chains 36, 38 are active.

The transfer case 12 will be able to shift "on the fly" (i.e., with the axles spinning but no torque present) into and out of four wheel drive if a synchronizer is used on the four wheel drive dog clutch 40. It will be necessary to come to a complete stop to shift from one ratio another by engaging and disengaging the clutches 30, 32, 34, unless the shift is made at zero torque with the engine controlled to match the oncoming gear synchronous speed.

Figure 2A:
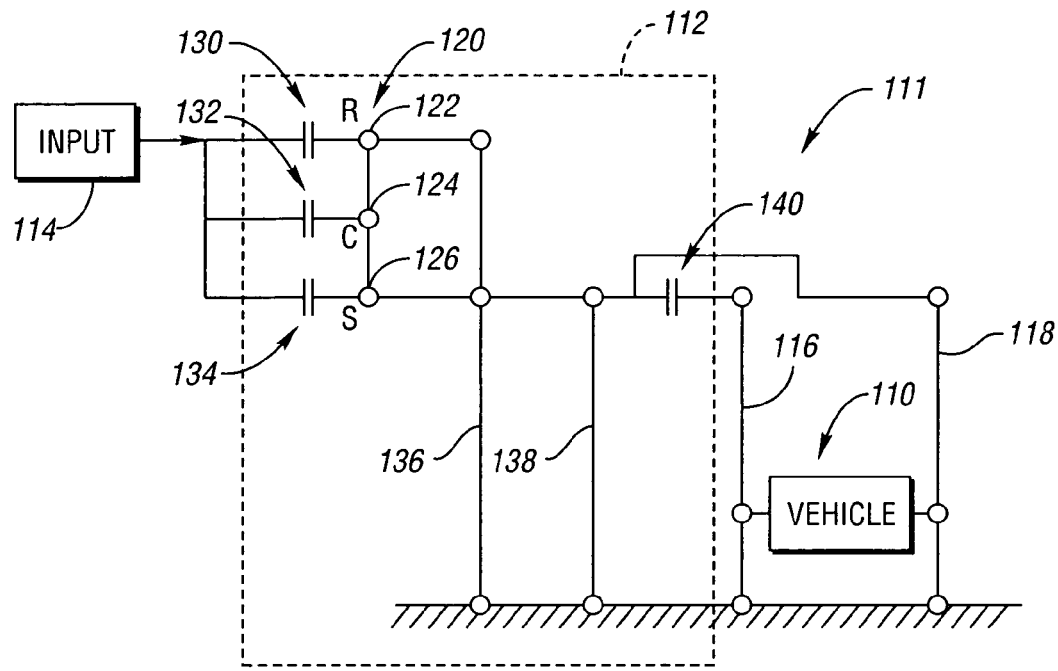
FIG. 2a shows a schematic lever diagram of a drive train in accordance with a first alternative embodiment of the invention.
Figure 2B:
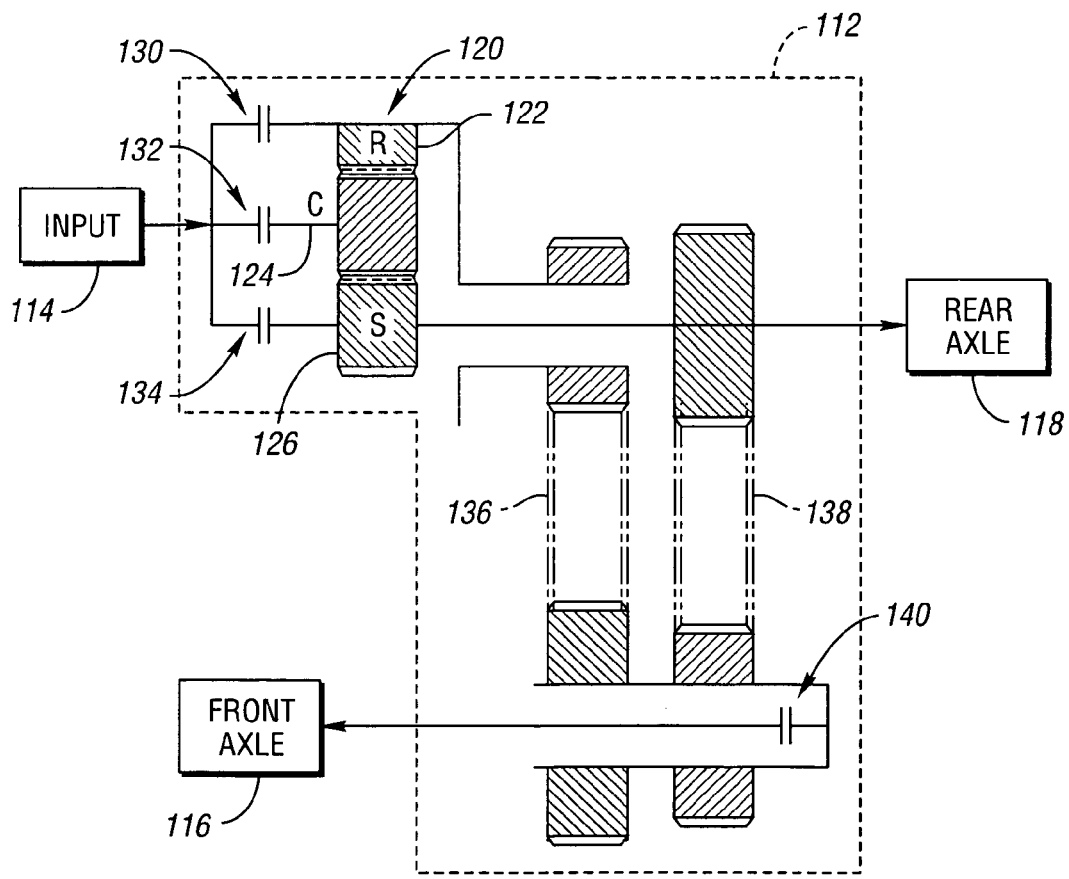

Turning to FIGS. 2a and 2b, a first alternative embodiment of the invention is shown. This configuration is similar to that shown in FIGS. 1a and 1b, except that the front and rear axles have identical axle ratios, and the transfer chain connections are swapped.

More specifically, as shown in FIGS. 2a and 2b, the first alternative embodiment of the invention is illustrated for a vehicle 110 incorporating a drive train 111 with a transfer case 112 for receiving torque from an input 114 and distributing the torque between the front and rear axles 116, 118. The transfer case 112 includes a planetary gear set 120 having first, second and third members 122, 124, 126. The first member 122 is a ring gear, the second member 124 is a carrier, and the third member 126 is a sun gear. A first input clutch 130 selectively connects the input 114 with the ring gear 122, a second input clutch 132 selectively connects the input 114 with the carrier 124, and a third input clutch 134 selectively connects the input 114 with the sun gear 126.

The transfer case 112 also includes a first transfer chain 136, which has an underdrive ratio, and is connected with the ring gear 122. A second transfer chain 138 has a 1:1 ratio and is connected with the sun gear 126.

A four wheel drive clutch 140 is also provided for selectively connecting the front and rear axles 116, 118. In this embodiment, the front and rear axles each have an axle ratio of 3.15, and the first transfer chain 136 has a 1.30:1 underdrive ratio. The four wheel drive clutch 140 is a dog clutch having a synchronizer.

To achieve rear wheel drive low, the first input clutch 130 is engaged, and power flows from the input 114 through the clutch 130 and ring gear 122, and through the chains 136, 138 to the rear axle 118. Four wheel drive low may then be achieved by engaging the four wheel drive clutch 140 to connect the transfer chains 136, 138 to the front axle 116.

To achieve rear wheel drive "mid," the second input clutch 132 is engaged, and power flows through the carrier 124, and is split between the ring gear 122 and the sun gear 126. From the sun gear 126, power flows to the rear axle.

From the ring gear 122, power flows through the chains 136, 138 to the rear axle. Four wheel drive mid may then be provided by engaging the four wheel drive clutch 140 to connect the front axle 116 with the transfer chains 136, 138.

Rear wheel drive high may be achieved by engaging the third input clutch 134 so that power flows through the clutch 134 and sun gear 126 directly to the rear axle 118. This would be the maximum fuel economy mode because no chains are active. Four wheel drive high may be achieved by engaging the four wheel drive clutch 140 and the third input clutch 134 for connecting the transfer chains 136, 138 to the front axle 116.

Figure 3A:
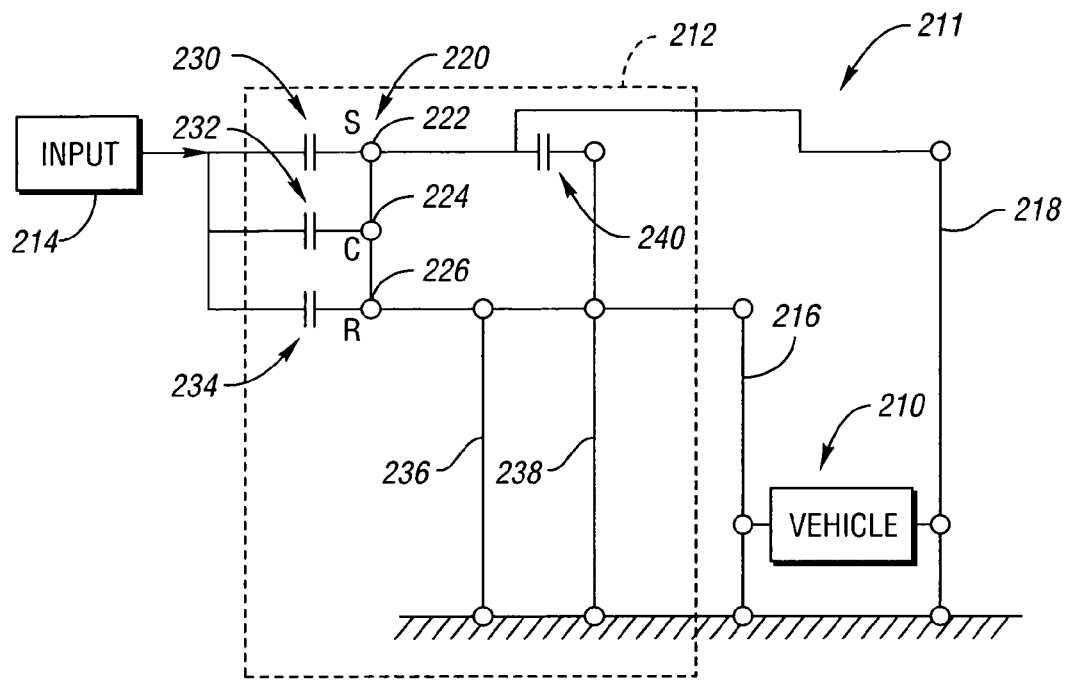
FIG. 3a shows a schematic lever diagram of a drive train incorporating a transfer case in accordance with a second alternative embodiment of the invention.
Figure 3B:
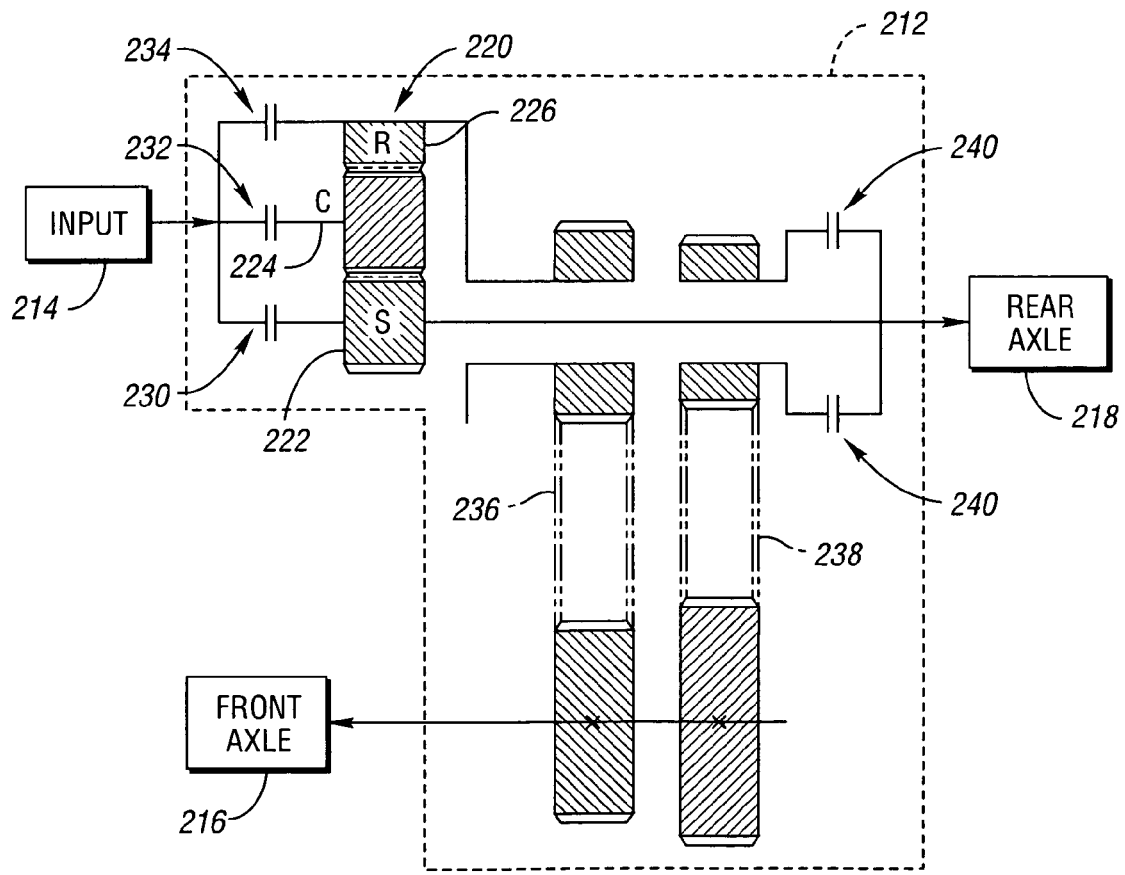

Turning to FIGS. 3a and 3b, a second alternative embodiment of the invention is shown. This embodiment is similar to that of FIGS. 1a and 1b except that the location of the four wheel drive clutch is changed.

As shown in FIGS. 3a and 3b, the vehicle 210 incorporates a drive train 211 having a transfer case 212 for receiving torque from an input 214 and distributing the torque between the front and rear axles 216, 218 of the vehicle 210. The transfer case 212 includes the planetary gear set 220 which is a simple planetary gear set including first, second and third members 222, 224, 226. The first member 222 is a sun gear, the second member 224 is a carrier, and the third member 226 is a ring gear. The first input clutch 230 selectively connects the input 214 with the sun gear 222. The second input clutch 232 selectively connects the input 214 with the carrier 224. The third input clutch 234 selectively connects the input 214 with the ring gear 226. A first transfer chain 236 having a 1:1 chain ratio is connected between the ring gear 226 and the front axle 216. A second transfer chain 238 having a ratio equal to the rear axle ratio divided by the front axle ratio (1.30:1 underdrive) is connected to the front axle 216 and the first transfer chain 236. The rear axle has a 4.10 axle ratio and the front axle has a 3.15 axle ratio. A four wheel drive clutch 240 selectively connects the second transfer chain 238 with the rear axle 218.

To achieve rear wheel drive low, the input clutch 230 connects the input 214 with the sun gear 222. Torque then flows directly to the rear axle 218. Four wheel drive low may be activated by engaging the four wheel drive clutch 240 so that torque is carried to the front axle by the second transfer chain 238.

In order to achieve all wheel drive mid, the second input clutch 232 is engaged, and torque is split between the sun gear 222 and ring gear 226. The sun gear 222 drives the rear axle 218, and the ring gear 226 drives the front axle 216 through the transfer chain 236. Four wheel drive may then be achieved by engaging the four wheel drive clutch 240 to connect the second transfer chain 238 with the rear axle 218.

Front wheel drive high is achieved by engaging the third input clutch 234 so that torque goes through the ring gear 226 to the front axle 216 through the transfer chain 236. This is the maximum fuel economy mode. Four wheel drive high may then be achieved by engaging the four wheel drive clutch 240 to connect the second transfer chain 238 with the rear axle 218.

Figure 4A:
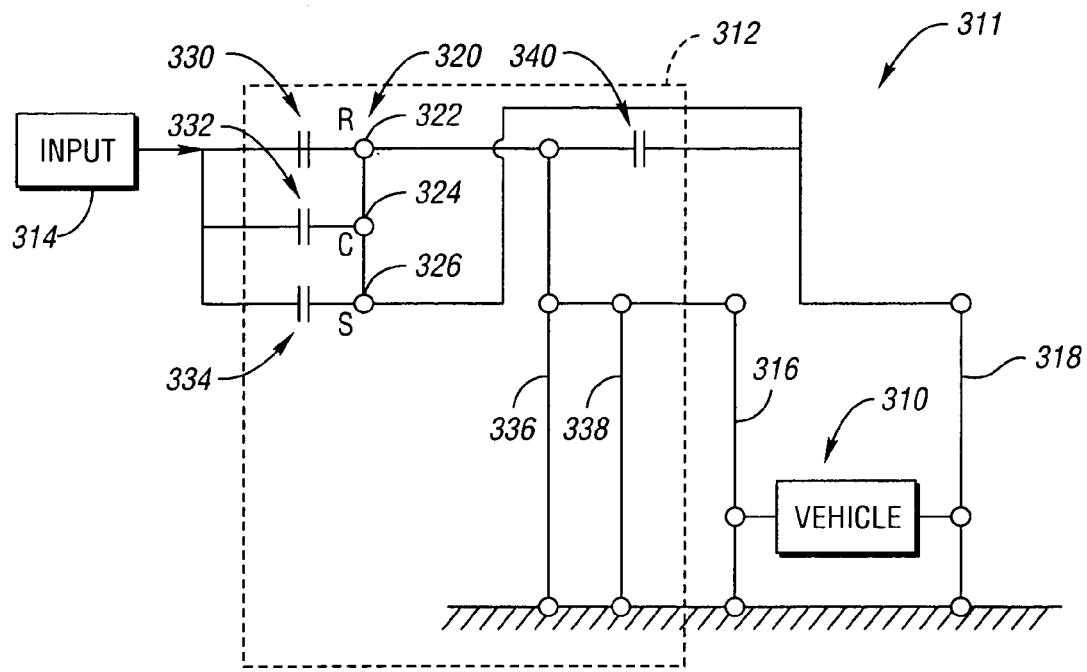
FIG. 4a shows a schematic lever diagram of a drive train incorporating a transfer case in accordance with a third alternative embodiment of the invention.
Figure 4B:
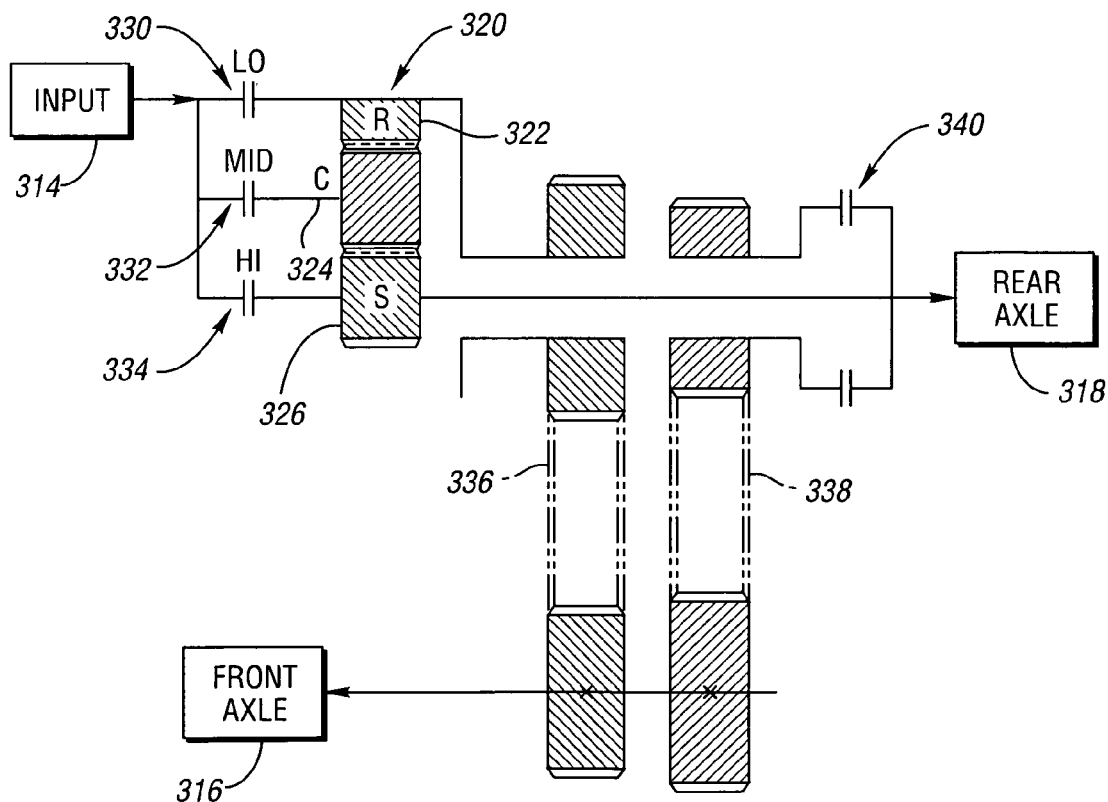

Turning to FIGS. 4a and 4b, a third alternative embodiment of the invention is shown. This embodiment is similar to the first alternative embodiment in that the front and rear axle ratios are the same, but the location of the 4WD clutch is different from the first alternative embodiment. The vehicle 310 includes a drive train 311 having a transfer case 312 for receiving torque from an input 314 and distributing the torque between the front and rear axles 316, 318 of the vehicle 310. The transfer case 312 includes a planetary gear set 320, having first, second and third members 322, 324, 326. The first member 322 is a ring gear, the second member 324 is a carrier, and the third member 326 is a sun gear.

The first input clutch 330 selectively connects the input 314 with the ring gear 322. The second input clutch 332 selectively connects the input 314 with the carrier 324. The third input clutch 334 selectively connects the input 314 with the sun gear 326. The first transfer chain 336 has a 1.30:1 underdrive ratio, and is connected between the ring gear 322 and the front axle 316. The second transfer chain 338 has a 1:1 chain ratio and is connected to the first transfer chain 336 and the front axle 316.

The four wheel drive clutch 340 selectively connects the first and second transfer chains 336, 338 with the rear axle 318.

In order to achieve front wheel drive low, the first input clutch 330 is engaged, and power travels through the ring gear 322 to the front axle 316 via the first transfer chain 336. Four wheel drive low may be achieved by engaging the four wheel drive clutch 340 which connects the second transfer chain 338 to the rear axle 318.

All wheel drive mid may be achieved by engaging the second input clutch 332. With the clutch 332 engaged, the planetary gear set 320 splits the input torque between the ring gear 322 and the sun gear 326. The ring gear 322 drives the front axle 316 via the first transfer chain 336, and the sun gear 326 drives the rear axle 318 directly. The torque split as determined by the ring gear/sun gear tooth ratio of the planetary gear set 320. Four wheel drive mid may be achieved by engaging the four wheel drive clutch 340 and the clutch 332. The four wheel drive clutch 340 connects the rear axle 318 with the front axle 316 via the second transfer chain 338.

Rear wheel drive high may be achieved by engaging the third input clutch 334. Torque flows through the sun gear 326 directly to the rear axle 318. This is the maximum fuel economy mode because no chains are active. Four wheel drive high may be engaged by activating the four wheel drive clutch 340 and the third input clutch 334. The four wheel drive clutch 340 connects the rear axle 318 with the front axle 316 via the transfer chain 338.

In a further embodiment, the location of the ring gear 322 and sun gear 326 may be swapped from the embodiment shown in FIG. 4a to achieve different ratios.

While the best modes for carrying out the invention have been described in detail, those familiar with the art to which this invention relates will recognize various alternative designs and embodiments for practicing the invention within the scope of the appended claims. For instance, the simple planetary gear set can be replaced by a compound planetary gear set. When a compound gear set is used, the compound gear set ring gear will be equivalent to the carrier of the simple planetary gear set, and the sun gear and carrier of the compound planetary gear set can be interchanged depending on the choice of ring gear/sun gear tooth ratio.

The invention claimed is:

1. A transfer case for a vehicle having front and rear axles, the transfer case comprising:
    first, second and third input clutches directly connected to an input shaft and connected to first, second and third members of a planetary gear set, respectively;
    first and second transfer chains continuously connected to each other and operatively engageable between said planetary gear set and the front and rear axles, at least one of said transfer chains being connected with a member of said planetary gear set;

a four wheel drive clutch operative to selectively connect the front and rear axles; and said four wheel drive clutch and first, second and third input clutches being selectively engageable to provide three speed ratios and four wheel drive.

2. The transfer case of claim 1, wherein said first, second and third members comprise a sun gear, carrier and ring gear, respectively.

3. The transfer case of claim 2, wherein said ring gear is connected to said first chain, and said sun gear is connected to said second chain.

4. The transfer case of claim 3, wherein said first chain has a 1:1 chain ratio, and said second chain has an underdrive ratio.

5. The transfer case of claim 4, wherein said four wheel drive clutch selectively connects said second chain to the front axle.

6. The transfer case of claim 1, wherein said first, second and third members comprise a ring gear, carrier and sun gear, respectively.

7. The transfer case of claim 6, wherein said ring gear is connected to said first chain, and said sun gear is connected to said second chain.

8. The transfer case of claim 7, wherein said first chain has an underdrive ratio, said second chain has a 1:1 ratio, and said four wheel drive clutch selectively connects said first and second chains with the front axle.

9. The transfer case of claim 8, wherein said sun gear is directly connectable with the rear axle.

10. The transfer case of claim 1, wherein said first, second and third input clutches and said four wheel drive clutch are selectively engageable to provide rear wheel drive low, four wheel drive low, rear wheel drive mid, four wheel drive mid, rear wheel drive high and four wheel drive high ratios.

11. The transfer case of claim 2, wherein said ring gear is connected with the first chain, and said second chain is connectable with said sun gear and the rear axle through said four wheel drive clutch.

12. The transfer case of claim 11, wherein said first, second and third input clutches and said four wheel drive clutch are selectively engageable to provide rear wheel drive low, four wheel drive low, all wheel drive mid, four wheel drive mid, front wheel drive high, and four wheel drive high ratios.

13. The transfer case of claim 6, wherein said ring gear is connected to said first chain, said sun gear is connectable with the rear axle, said first chain has an underdrive ratio, said second chain has a 1:1 ratio, and said four wheel drive clutch selectively connects said ring gear and said first chain with the rear axle.

14. A drive train for a vehicle, comprising:
front and rear axles; and a transfer case including:
first, second and third input clutches connected to an input shaft and connected to first, second and third members of a planetary gear set, respectively;
first and second transfer chains continuously connected to each other and operatively engageable between said planetary gear set and the front and rear axles, at least one of said transfer chains being connected with a member of said planetary gear set;
a four wheel drive clutch operative to selectively connect the front and rear axles; and
said four wheel drive clutch and first, second and third input clutches being selectively engageable to provide three speed ratios and four wheel drive.

15. The drive train of claim 1, wherein said front and rear axles have different axle ratios.

16. The drive train of claim 15, wherein said first, second and third members comprise a sun gear, carrier and ring gear, respectively; said ring gear is connected to said first chain, and said sun gear is connected to said second chain; said first chain has a 1:1 chain ratio, and said second chain has an underdrive ratio; and said four wheel drive clutch selectively connects said second chain to the front axle.

17. The drive train of claim 14, wherein said first, second and third members comprise a ring gear, carrier and sun gear, respectively; said ring gear is connected to said first chain, and said sun gear is connected to said second chain; said first chain has an underdrive ratio, said second chain has a 1:1 ratio, and said four wheel drive clutch selectively connects said first and second chains with the front axle; and said sun gear is directly connectable with the rear axle.

18. The drive train of claim 14, wherein said first, second and third input clutches and said four wheel drive clutch are selectively engageable to provide rear wheel drive low, four wheel drive low, rear wheel drive mid, four wheel drive mid, rear wheel drive high and four wheel drive high ratios.

19. The drive train of claim 15, wherein said first, second and third members comprise a sun gear, carrier and ring gear, respectively; wherein said ring gear is connected with the first chain, and said second chain is connectable with said sun gear and the rear axle through said four wheel drive clutch; and said first, second and third input clutches and said four wheel drive clutch are selectively engageable to provide rear wheel drive low, four wheel drive low, all wheel drive mid, four wheel drive mid, front wheel drive high, and four wheel drive high ratios.

20. The drive train of claim 14, wherein said first, second and third members comprise a ring gear, carrier and sun gear, respectively; and said ring gear is connected to said first chain, said sun gear is connectable with the rear axle, said first chain has an underdrive ratio, said second chain has a 1:1 ratio, and said four wheel drive clutch selectively connects said ring gear and said first chain with the rear axle.

21. A transfer case for a vehicle having front and rear axles, the transfer case comprising:
first, second and third input clutches connected to first, second and third members of a planetary gear set, respectively;
first and second transfer chains connected to each other and operatively engageable between said planetary gear set and the front and rear axles, at least one of said transfer chains being connected with a member of said planetary gear set;
a four wheel drive clutch operative to selectively connect the front and rear axles; and
said four wheel drive clutch and first, second and third input clutches being selectively engageable to provide three speed ratios and four wheel drive;
wherein said first, second and third members comprise a sun gear, carrier and ring gear, respectively; said ring gear is connected to said first chain, and said sun gear is connected to said second chain; and said first chain has a 1:1 chain ratio, and said second chain has an underdrive ratio.

* * * * *